United States Patent
Lee

(10) Patent No.: US 10,672,566 B2
(45) Date of Patent: Jun. 2, 2020

(54) TOUCH WINDOW HAVING IMPROVED ELECTRODE PATTERN STRUCTURE

(71) Applicant: LG INNOTEK CO., LTD., Seoul (KR)

(72) Inventor: Keun Sik Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/395,684

(22) Filed: Apr. 26, 2019

(65) Prior Publication Data

US 2019/0252132 A1    Aug. 15, 2019

Related U.S. Application Data

(63) Continuation of application No. 16/033,732, filed on Jul. 12, 2018, now Pat. No. 10,325,732, which is a
(Continued)

(30) Foreign Application Priority Data

Jun. 29, 2012    (KR) ................. 10-2012-0071440

(51) Int. Cl.
   | | |
   |---|---|
   | *H01H 1/06* | (2006.01) |
   | *G06F 3/041* | (2006.01) |
   | *G02F 1/1333* | (2006.01) |

(52) U.S. Cl.
   CPC ........... *H01H 1/06* (2013.01); *G02F 1/13338* (2013.01); *G06F 3/041* (2013.01); *G06F 2203/04103* (2013.01)

(58) Field of Classification Search
   None
   See application file for complete search history.

(56) References Cited

U.S. PATENT DOCUMENTS

| | | |
|---|---|---|
| 2009/0135854 A1 | 5/2009 | Bettin et al. |
| 2009/0213090 A1 | 8/2009 | Mamba et al. |
| | (Continued) | |

FOREIGN PATENT DOCUMENTS

| | | |
|---|---|---|
| KR | 10-2010-0095886 A | 9/2010 |
| KR | 10-2011-0087153 A | 8/2011 |
| KR | 10-2012-0069234 A | 6/2012 |

OTHER PUBLICATIONS

Office Action dated Sep. 30, 2013 in Korean Application No. 10-2012-0071440.
(Continued)

*Primary Examiner* — Amare Mengistu
*Assistant Examiner* — Sarvesh J Nadkarni
(74) *Attorney, Agent, or Firm* — Saliwanchik, Lloyd & Eisenschenk

(57) ABSTRACT

Disclosed is a touch window. The touch window includes a cover window, a first sensing electrode layer formed on a view area (V/A) of the cover window and including a first electrode pattern including a first unit cell electrode pattern, and a second sensing electrode layer formed on the view area and including a second electrode pattern which crosses the first electrode pattern and includes a second unit cell electrode pattern. A ratio of an area of the space part between a first unit cell electrode pattern and a second unit cell electrode pattern adjacent to the first unit cell electrode pattern with respect to an area of the first unit cell electrode pattern of the first electrode pattern or the second unit cell electrode pattern of the second electrode pattern is in the range of 10% to 20%.

21 Claims, 9 Drawing Sheets

Related U.S. Application Data continuation of application No. 15/195,148, filed on Jun. 28, 2016, now Pat. No. 10,049,826, which is a continuation of application No. 13/930,655, filed on Jun. 28, 2013, now Pat. No. 9,496,097.

(56) References Cited

U.S. PATENT DOCUMENTS

| | | | |
|---|---|---|---|
| 2009/0309850 A1* | 12/2009 | Yang | G06F 3/044 345/174 |
| 2009/0315847 A1 | 12/2009 | Fujii | |
| 2009/0315854 A1 | 12/2009 | Matsuo | |
| 2010/0045625 A1 | 2/2010 | Yang et al. | |
| 2011/0032193 A1 | 2/2011 | Szalkowski | |
| 2012/0062472 A1* | 3/2012 | Yilmaz | G06F 3/041 345/173 |

OTHER PUBLICATIONS

Office Action dated Apr. 9, 2015 in U.S. Appl. No. 13/930,655.
Office Action dated Dec. 2, 2015 in U.S. Appl. No. 13/930,655.

* cited by examiner

TOUCH WINDOW HAVING IMPROVED ELECTRODE PATTERN STRUCTURE

CROSS-REFERENCE TO RELATED APPLICATIONS

This application is a continuation of U.S. application Ser. No. 16/033,732, filed Jul. 12, 2018; which is a continuation of U.S. application Ser. No. 15/195,148, filed Jun. 28, 2016, now U.S. Pat. No. 10,049,826, issued Aug. 14, 2018; which is a continuation of U.S. application Ser. No. 13/930,655, filed Jun. 28, 2013, now U.S. Pat. No. 9,496,097, issued Nov. 15, 2016; which claims the benefit under 35 U.S.C. § 119 of Korean Patent Application No. 10-2012-0071440, filed Jun. 29, 2012; all of which are hereby incorporated by reference in their entirety.

BACKGROUND

The embodiment relates to a scheme capable of effectively forming an electrode pattern of a touch window.

A touch window is installed on a display surface of an image display device including a cathode ray tube (CRT), a liquid crystal display (LCD), a field emission display (FED), a plasma display panel (PDP), or an electro-luminescence device (ELD), so that a user inputs predetermined information into an electronic appliance by pressing a touch panel while viewing the image display device.

The touch window includes a cover window W to receive a touch from the outside, a touch screen panel (TSP) provided at a lower portion of the cover window W and divided into a view area (V/A) and a dead area (D/A) through a sensing electrode layer, and a button part electrically connected to the touch screen panel and realized in the form of an icon on the surface of the cover window.

However, although various electrode materials including indium-tin oxide (ITO) have been applied to an electrode pattern to form a sensing electrode pattern, the electrode materials do not represent sufficient optical characteristics. In addition, recently, although a sensing electrode layer is formed by designing an effective part by patterning the electrode pattern according to the demand for a multi-touch, the electrode pattern is viewed at the upper portion of a touch screen panel due to the transmittance and the color difference of the electrode pattern.

FIG. 1 is a view showing one example in which electrode patterns are formed according to the related art.

The electrode patterns shown in FIG. 1 are easily viewed by the eyes of a user because the interval between adjacent electrode patterns is wide. In other words, when a touch window is applied to a product for the use of a user, inferior visibility is represented, and internal circuits and electrode patterns are leaked so that security problems are caused.

SUMMARY

The embodiment provides a touch window capable of improving visibility by inhibiting an electrode pattern from being viewed to the outside by making the ratio of the area of the space, which is formed between unit cell electrode patterns, to the area of the unit cell electrode pattern as the ratio of 10% to 20%.

The embodiment provides a touch window capable of inhibiting the shape of an electrode pattern from being leaked to the outside by forming a dummy pattern, which does not receive a touch input, in a space without the electrode pattern.

According to one embodiment, there is provided a touch window including a cover window, a first sensing electrode layer formed on a view area (V/A) of the cover window and including a first electrode pattern including a first unit cell electrode pattern, a second sensing electrode layer formed on the view area and including a second electrode pattern which crosses the first electrode pattern and includes a second unit cell electrode pattern, and a space part between the first unit cell electrode pattern and the second unit cell electrode pattern adjacent to the first unit cell electrode pattern. A ratio of an area of the space part to an area of the first unit cell electrode pattern or the second unit cell electrode pattern may be in a range of 10% to 20%.

The touch window may further include a pattern layer formed in the space part and having a dummy pattern which does not receive a touch input.

The pattern layer may have the dummy pattern including at least one material of polyethylene terephthalate (PET), polycarbonate (PC), polyether sulfone (PES), polyimide (PI), and polymethyl methacrylate (PMMA).

The pattern layer may have the dummy pattern including a material different from a material constituting the first electrode pattern or the second electrode pattern.

In the first and second sensing electrode layers, a first lead electrode, which is configured to connect first unit cell electrode patterns to each other, and a second lead electrode, which is configured to connect second unit cell electrode patterns to each other, may have lengths in the range of 1 μm to 30 μm.

The space part may have a width smaller than or larger than a width of the first lead electrode or a width of the second lead electrode.

The touch window may further include a wiring part formed in a dead area of the cover window and including a wiring pattern connected with the first and second electrode patterns.

The first sensing electrode layer may include the first electrode pattern directly formed on the cover window, and the second sensing electrode layer may include the second electrode pattern formed on a base substrate bonded to an opposite surface of the first sensing electrode layer through an adhesive layer.

The first and second sensing electrode layers may include the first and second electrode patterns formed on one surface of the base substrate bonded to the cover window and on a surface opposite to the one surface.

The first sensing electrode layer may include the first electrode pattern on a first base substrate bonded to one surface of the cover window, and the second sensing electrode layer may include the second electrode pattern on a second base substrate bonded to an opposite surface of the first sensing electrode layer As described above, according to one embodiment, visibility can be improved by inhibiting an electrode pattern from being viewed to the outside by making the ratio of the area of the space, which is formed between unit cell electrode patterns, to the area of the unit cell electrode pattern as the ratio of 10% to 20%.

According to the embodiment, the shape of an electrode pattern can be inhibited from being leaked to the outside by forming a dummy pattern, which does not receive a touch input, in a space without the electrode pattern.

DETAILED DESCRIPTION OF THE EMBODIMENTS

Figure 1:
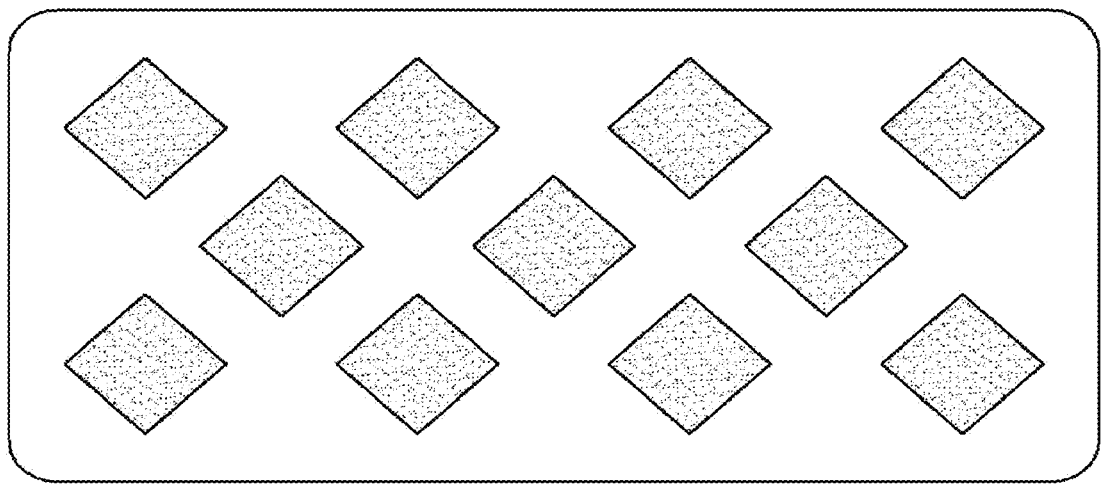
FIG. 1 is a view showing one example in which an electrode pattern is formed according to the related art.
Figure 1:
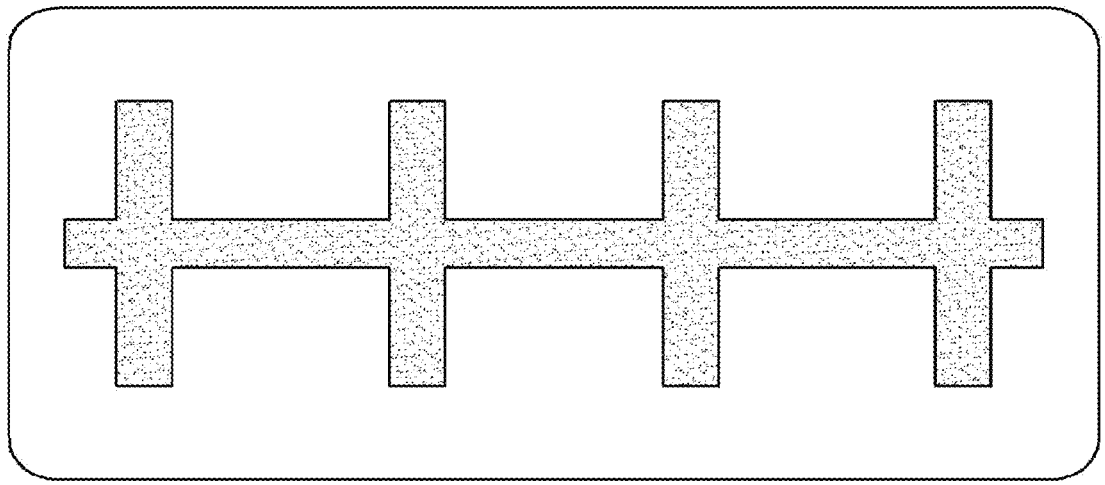

Hereinafter, the structure and the operation according to the embodiment will be described in detail with reference to accompanying drawings. In the following description based on the accompanying drawings, the same elements will be assigned with the same reference numerals regardless of drawing numbers, and the repetition in the description of the same elements having the same reference numerals will be omitted in order to avoid redundancy. Although the terms "first" and "second" may be used in the description of various elements, the embodiment is not limited thereto. The terms "first" and "second" are used to distinguish one element from the other elements.

Figure 2A:
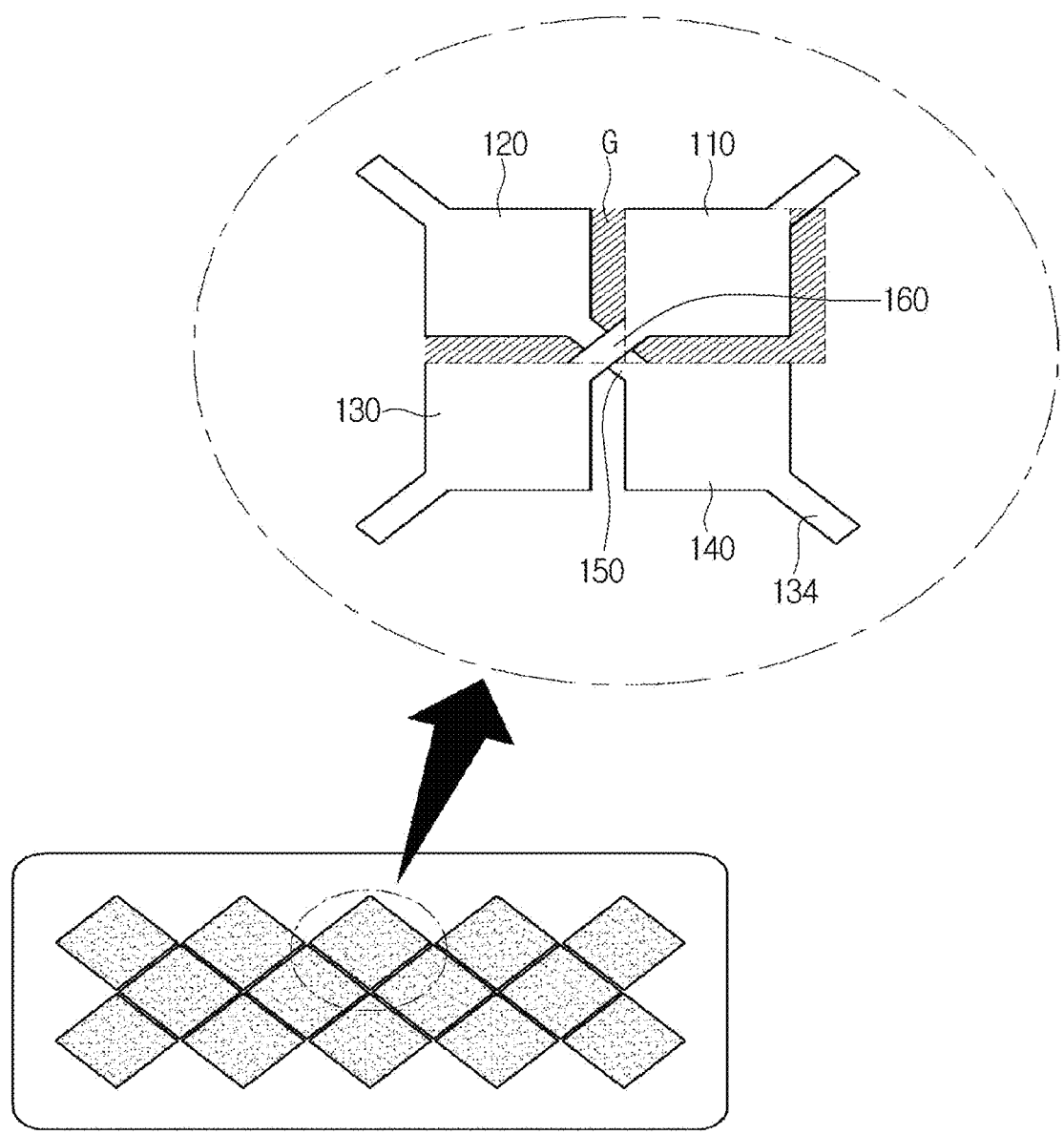
FIGS. 2a and 2b are views showing an electrode pattern formed at a sensing electrode layer in a touch window according to one embodiment.
Figure 2B:
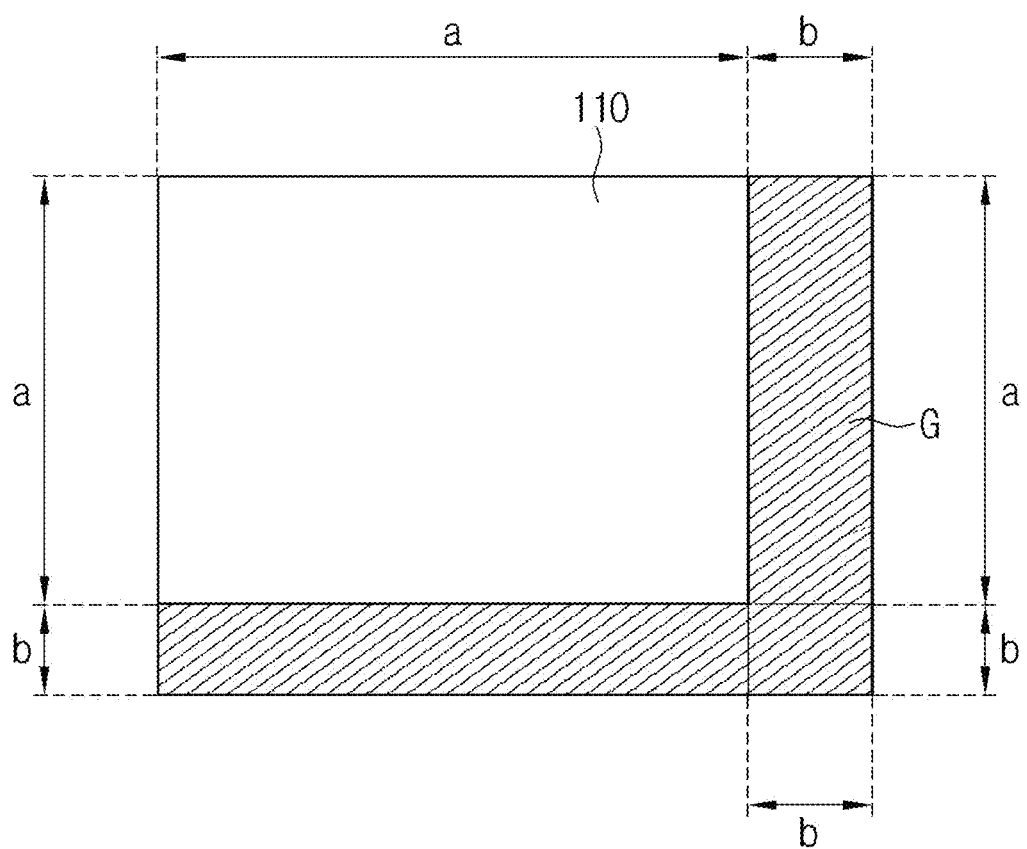

FIGS. 2a and 2b are views showing an electrode pattern formed at a sensing electrode layer in a touch window according to one embodiment.

Referring to FIG. 2a, the touch window includes a cover window, a first sensing electrode layer, a second sensing electrode layer, and a space part G.

The first and second sensing electrode layers are provided in a view area (V/A). The view area is an area in which an input touch is received when the touch is input into the cover window from the outside. The first and second sensing electrode layers are provided under the cover window.

The first sensing electrode layer includes a first electrode pattern. One of plural first electrode patterns 110 and 130 is referred to a first unit cell electrode pattern.

The second sensing electrode layer includes a second electrode pattern. The second electrode pattern crosses the first electrode pattern. One of plural second electrode patterns 120 and 140 is referred to as a second unit cell electrode pattern.

The first electrode pattern may cross the second electrode pattern without overlapping with the second electrode pattern. In other words, a plurality of first electrode patterns may be formed at the first sensing electrode layer, and a plurality of second electrode patterns may be formed at the second sensing electrode layer.

For example, a plurality of first electrode patterns to determine the components of a first axis (e.g., X axis) may be formed at the first sensing electrode layer, and a plurality of second electrode patterns to determine the components of a second axis (e.g., Y axis) may be formed at the second sensing electrode layer. Preferably, the first and second sensing electrode layers are patterned in the configuration in which the first and second electrode layers are insulated from each other.

The space part G is provided between the first unit cell electrode pattern 110 and the second unit cell electrode pattern 120 adjacent to the first unit cell electrode pattern 110. Space parts G may be provided between the first unit cell electrode patterns 110 and 130 and the second unit cell electrode patterns 120 and 140, respectively.

In this case, the area of the space part G may be 10% to 20% of the area of the first unit cell electrode pattern 110 or the second unit cell electrode pattern 120.

In other words, the ratio of the area of a space, which is provided between the first unit cell electrode pattern and the second unit cell electrode pattern adjacent to the first unit cell electrode pattern, to the area of the first unit cell electrode pattern of the first electrode pattern or the area of the second unit cell electrode pattern of the second electrode pattern is 10% to 20%.

Accordingly, the space between the first and second unit cell electrode patterns may be formed with the width of 30 µm or less. In other words, the width of the space part G may be 30 µm or less.

According to the related art, a wide space is formed between the first unit cell electrode pattern 110 and the second unit cell electrode pattern 120 adjacent to the first unit cell electrode pattern 110, so that the electrode patterns stand out. In other words, the first and second electrode patterns are viewed.

However, according to the embodiment, the space part G has the area corresponding to 10% to 20% of the area of the first unit cell electrode pattern 110 or the second unit cell electrode pattern 120, so that the electrode patterns are not viewed. Accordingly, the visibility can be improved.

In detail, referring to FIG. 2b, on the assumption that the length and the width of the first unit cell electrode pattern 110 have a size of 'a', and the space between the two unit cells has the width of 'b', if the area ($b^2+2ab$) of spaces is divided by the whole area $a^2$ of the first unit cell electrode pattern 110, the result is obtained as ($b^2+2ab$)/$a^2$. In this case, the ratio of the area ($b^2+2ab$) of the spaces to the whole area $a^2$ of the first unit cell electrode pattern 110 may be 10% to 20%. In this case, if the ratio is less than 10%, the electric short between the two unit cells may occur. If the ratio exceeds 20%, the inferior visibility of the electrode pattern may be represented. For example, 'a' may be 4 mm, and 'b' may be 30 µm.

Accordingly, the length of a first lead electrode 150 to connect the first unit cell electrode patterns 110 and 130 to each other and the length of a second lead electrode 160 to connect the second unit cell electrode patterns 120 and 140 to each other may be 30 µm or less. In detail, the length of the first lead electrode 150 or the length of the second lead electrode 160 may be in the range of 1 µm to 30 µm.

Since the space between adjacent unit cell electrode patterns is narrowed as compared with that of the related art, the length of the lead electrode to connect the unit cell electrode patterns to each other is reduced together with the space.

In addition, the width of the space may be smaller than or larger than the width of the first lead electrode 150 or the second lead electrode 160. In other words, if the width of the first lead electrode 150 or the second lead electrode 160 is 28 µm, the width of the space may be 26 µm or 30 µm.

The touch window may further include a wiring part formed in a dead area (D/A) of the cover window and including a wiring pattern connected with the first and second electrode patterns. The dead area is an area in which an input touch is not received even if the touch is input into the cover window from the outside. Accordingly, in order to cover the wiring part, a printed pattern may be formed in the dead area. The printed pattern may be formed one time or several times.

Figure 3:
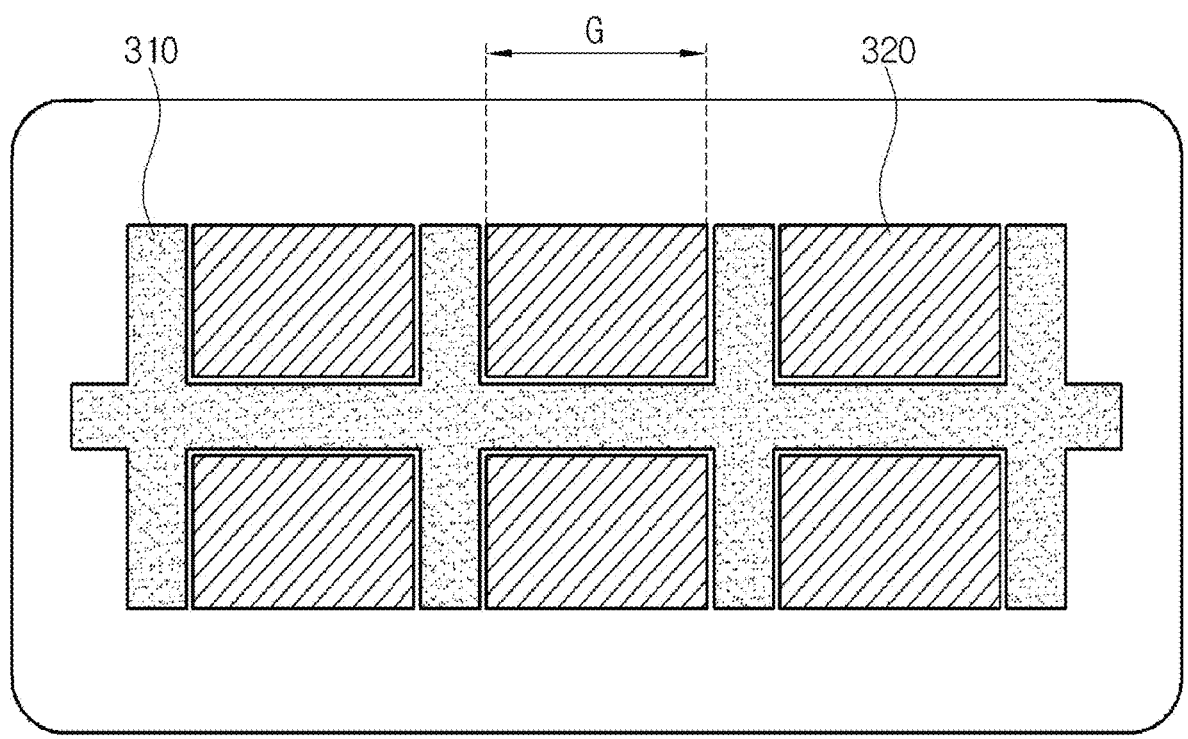
FIG. 3 is a view showing one example of an electrode pattern in a touch window according to another embodiment.

Hereinafter, a touch window according to another embodiment will be described with reference to FIG. 3. FIG. 3 is a view showing one example of an electrode pattern in the touch window according to another embodiment.

Referring to FIG. 3, in the touch window, a sensing electrode layer having an electrode pattern 310 may be formed in the cover window. Since electrode patterns 310 include conductive materials, the space part G may be formed between the electrode patterns 310 to inhibit the conductive materials from being conducted to each other due to the contact of the conductive materials.

In this case, the touch window may further include a pattern layer in which a dummy pattern 320, which does not receive a touch input, may be formed in the space part G. For example, the electrode pattern 310 may receive an input touch when the touch is input into the cover window, but the dummy pattern 320 does not receive the input touch even if the touch is input into the cover window.

According to the embodiment, the dummy pattern 320 may include at least one of indium-tin oxide (ITO), indium zinc oxide (IZO), zinc oxide (ZnO), carbon nano-tube (CNT), graphene, silver nano-wire (Ag NW), and conductive polymer constituting the first electrode pattern or the second electrode pattern.

According to another embodiment, the dummy pattern 320 may include a non-conductive material. For example, the dummy pattern 320 may include at least one of polyethylene terephthalate (PET), polycarbonate (PC), polyether sulfone (PES), polyimide (PI), and polymethyl methacrylate (PMMA).

Accordingly, the dummy pattern may include a material different from that constituting the electrode pattern.

According to the embodiment, since the dummy pattern 320 is provided at the space part G between the electrode patterns 310, the electrode pattern 310 can be inhibited from being viewed.

In addition, even if the electrode pattern 310 and the dummy pattern 320 are viewed from the outside, since the electrode pattern 310 is viewed together with the dummy pattern 320, the distinguishment between the electrode pattern 310 and the dummy pattern 320 is difficult, so that the security can be enhanced.

Meanwhile, the first and second sensing electrode layers may be provided therein with the first electrode pattern or the second electrode pattern including at least one of ITO, IZO, ZnO, CNT, graphene, Ag NW, and conductive polymer.

Meanwhile, the sensing electrode layer may be variously formed in the touch window.

FIGS. 4 to 8 are sectional views showing the structures of touch windows according to various embodiments.

Figure 4:
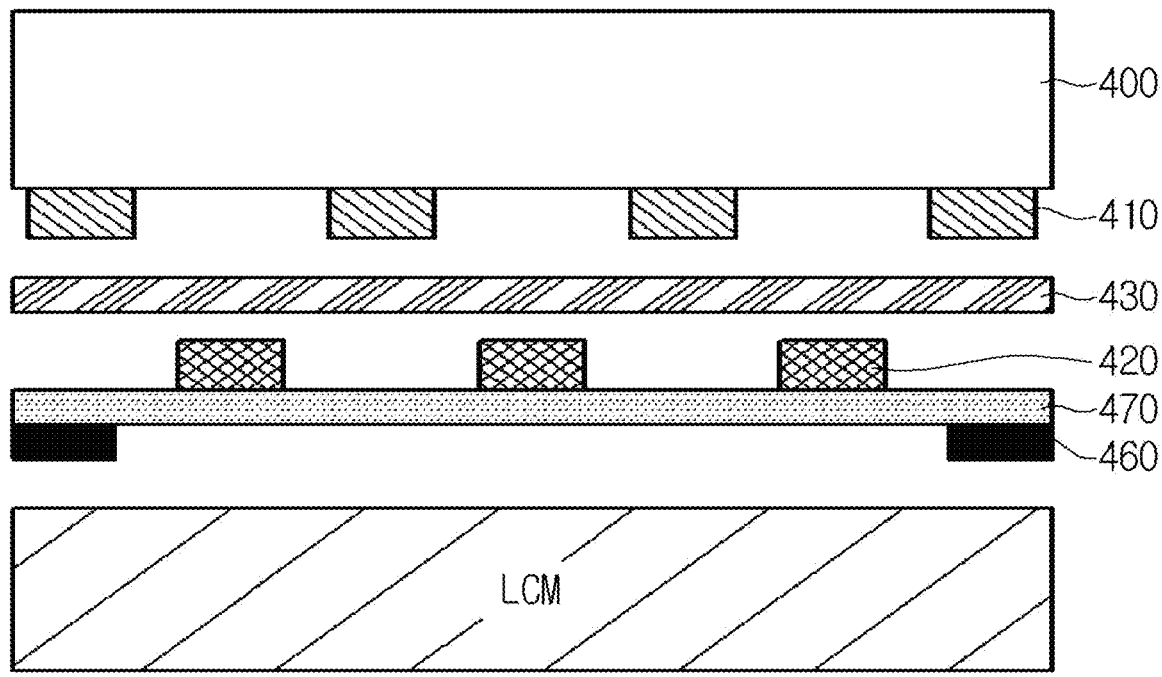
FIGS. 4 to 8 are sectional views showing the structures of touch windows according to various embodiments.

Referring to FIG. 4, in the touch window, a first electrode pattern is directly patterned on a cover window 400 to form a first sensing electrode layer 410, and a second electrode pattern is patterned on one surface of a base substrate 470 to form a second sensing electrode layer 320. In this case, the cover window 400 is bonded to the base substrate 470 through an adhesive material layer 430, and a double-sided adhesive tape 460 is provided on an opposite surface of the base substrate 470 so that the base substrate 470 adheres to a liquid crystal module LCM.

In this case, according to the embodiment, a dummy pattern may be formed in the base substrate 470 by utilizing the base substrate 470 as a pattern layer. The base substrate 470 may include a film material or glass. In this case, the film material may include at least one of PET, PC, PES, PI, and PMMA.

Figure 5:
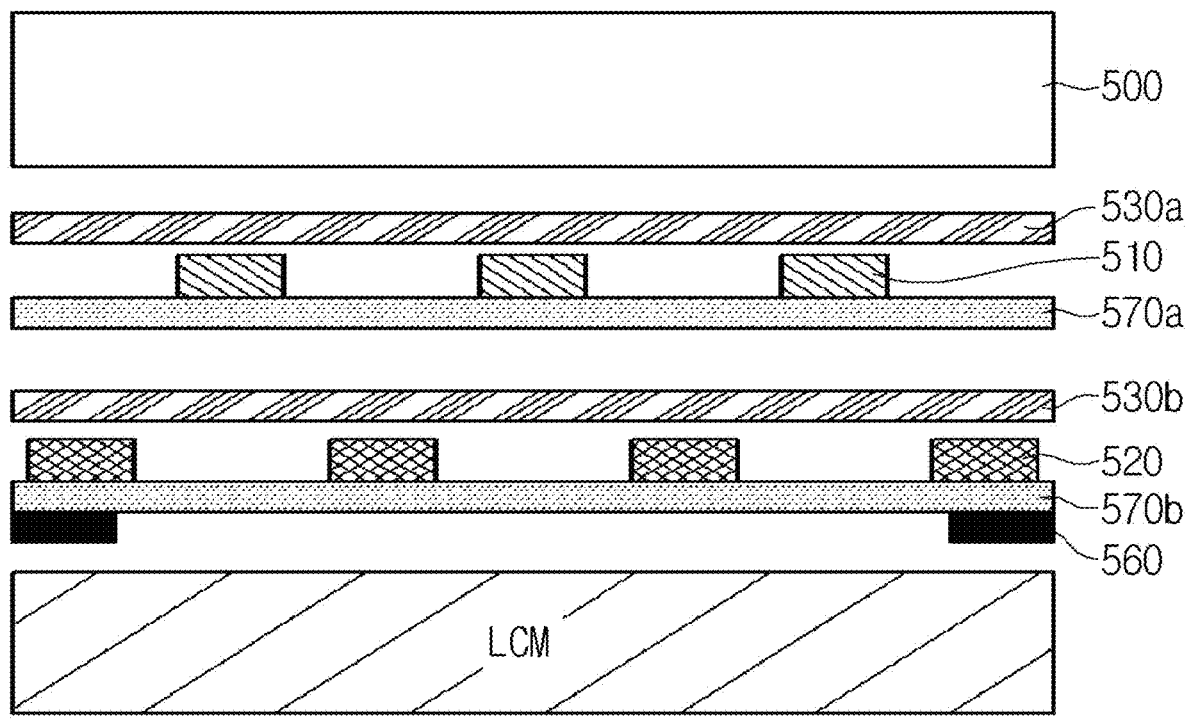

Referring to FIG. 5, in the touch window, a first electrode pattern is patterned in a first base substrate 570a bonded to the cover window 500 through a first adhesive material layer 530a to form a first sensing electrode layer 510, and a second electrode pattern is patterned at a second base substrate 570b to form a second sensing electrode layer 520. In this case, the first and second base substrates 570a and 570b are bonded to each other through the second adhesive material layer 530b. A double-sided adhesive tape 560 is provided on an opposite surface of the second base substrate 570b so that the second base substrate 570b adheres to a liquid crystal module (LCM).

Even in the case, a dummy pattern may be formed in the first base substrate 570a or the second base substrate 570b by utilizing the first base substrate 570a or the second base substrate 570b as a pattern layer.

Figure 6:
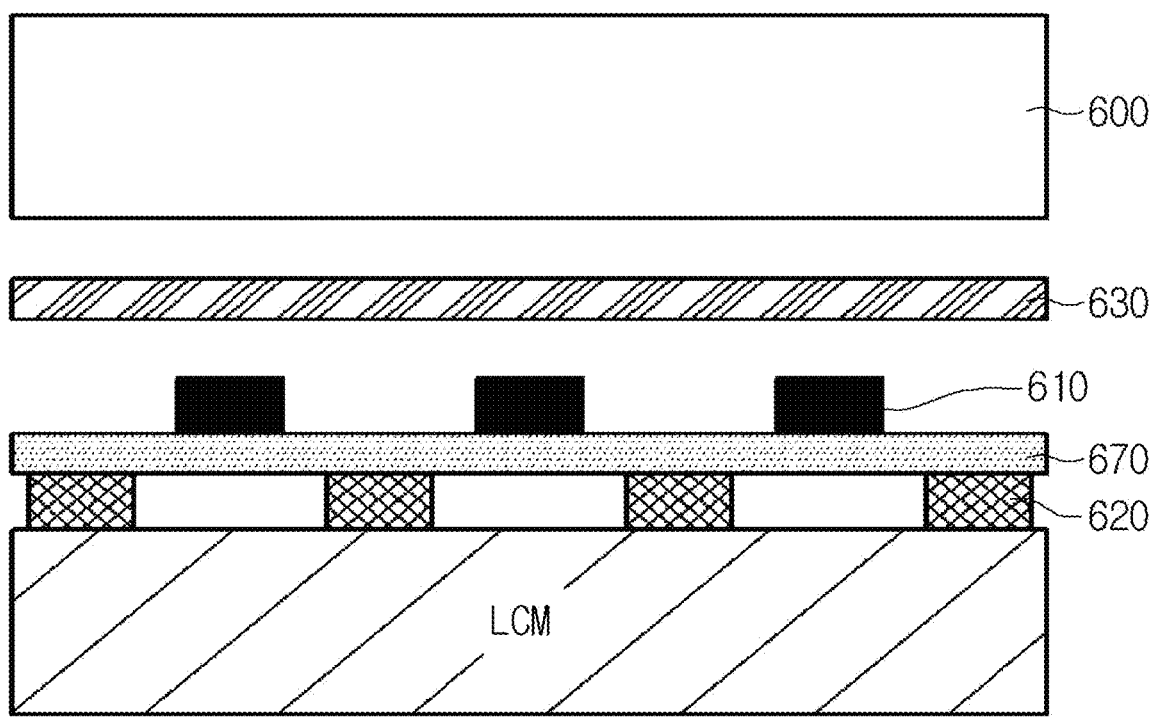

Referring to FIG. 6, in the touch window, a first sensing electrode layer 610 is formed on one surface of a base substrate 670 bonded to the cover window 600 through an adhesive material layer 630 by patterning the first electrode pattern, and a second sensing electrode layer 620 is formed on a surface opposite to the one surface of the base substrate 470 by patterning the second electrode pattern. In other words, the first and second electrode patterns are patterned on the same base substrate 670. A liquid crystal module (LCM) may be provided on an opposite surface of the second base substrate 670b having the second sensing electrode layer 620.

Figure 7:
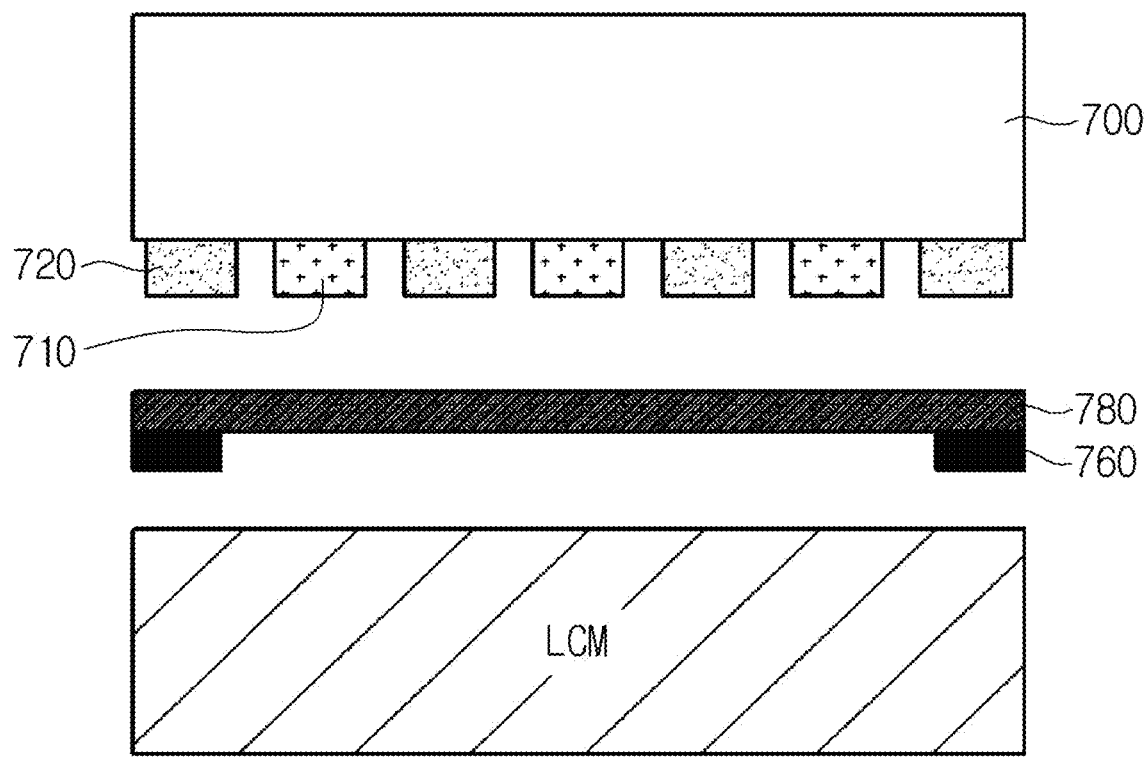

Referring to FIG. 7, in the touch window, on one surface of a cover window 700, a first sensing electrode layer 710 is formed by patterning a first electrode pattern, and a second sensing electrode layer 720 is formed by patterning a second electrode pattern. In other words, the first and second electrode patterns are patterned on the same cover window 700. The cover window 700 having the first and second sensing electrode layers 710 and 720 may be bonded to a liquid crystal module (LCM) through a double-sided adhesive tape 760 while interposing a protective layer 780 between the cover window 700 and the double-sided adhesive tape 760.

Figure 8:
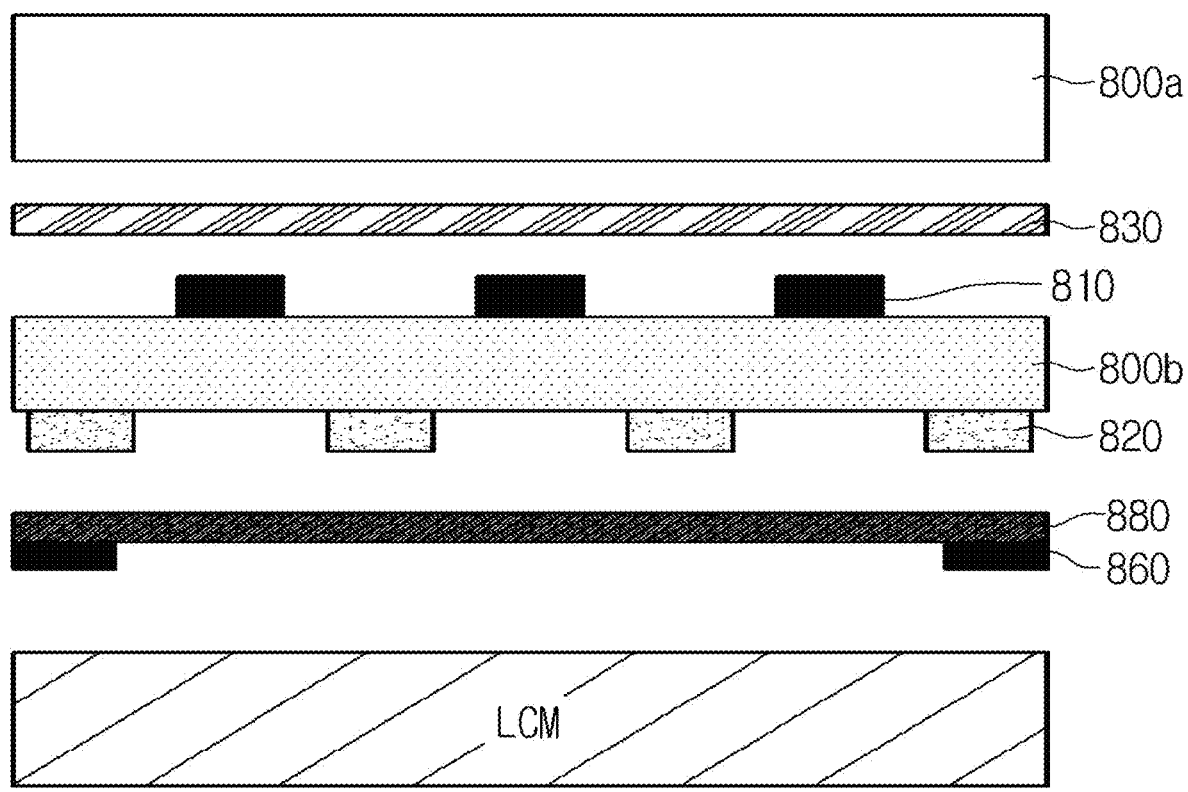

Referring to FIG. 8, in the touch window, a second cover window 800b different from a cover window 800a may be formed at the lower portion of the cover window 800a. A first sensing electrode layer 810 having a first electrode pattern may be formed on one surface of the second cover window 800b, and a second sensing electrode layer 820 having a second electrode pattern may be formed on a surface opposite to the one surface of the second cover window 800b. The cover window 800a and the second cover window 800b are bonded to each other through an adhesive material layer 830. The second cover window 800b may be bonded to an LCM through a double-sided adhesive tape 860 while interposing a protective layer 880 between the second cover window 800b and the LCM.

The touch window according to the embodiment can be attached to various display devices. In other words, the display devices may include an organic light emitting device, or a plasma display panel as well as a liquid crystal display. In this case, in order to inhibit noise components, which are generated during the driving of the display device, from being transferred to a touch sensor module, that is, a touch screen panel (TSP) to cause the erroneous operation of a touch sensing panel, a shield layer may be selectively interposed between the touch sensing panel and the display device.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

The invention claimed is:

1. A touch window comprising:
   a cover window;
   a base substrate;
   a first sensing electrode formed on the base substrate and comprising first unit cell electrode patterns and a first lead electrode connecting two first unit cell electrode patterns to each other;
   a second sensing electrode that crosses the first sensing electrode formed on the base substrate and comprising second unit cell electrode patterns and a second lead electrode connecting two second unit cell electrode patterns to each other;
   a first space part between a first first unit cell electrode pattern and a first second unit cell electrode pattern and a second second unit cell electrode pattern adjacent to the first first unit cell electrode pattern, such that an area of the first space part is a sum of a first area between the first first unit cell electrode pattern and the first second unit cell electrode pattern and a second area between the first first unit cell electrode pattern and the second second unit cell electrode pattern, wherein the first first unit cell electrode pattern, the first second unit cell electrode pattern, and the second second unit cell electrode pattern are disposed on a same surface of the base substrate; substrate, and
   wherein a ratio of the area of the first space part to an area of the first first unit cell electrode pattern is in a range of 10% to 20%.

2. The touch window of claim 1, wherein a minimum distance between one first unit cell electrode pattern and one second unit cell electrode pattern is 30 μm or less.

3. The touch window of claim 1, wherein a minimum width of the first space part is 30 μm or less.

4. The touch window of claim 1, wherein a minimum width of the first space part is smaller than a minimum width of at least one of the first lead electrode and the second lead electrode.

5. The touch window of claim 1, comprising at least one dummy pattern formed in the first space part and configured to not receive a touch input.

6. The touch window of claim 5, wherein a plurality of dummy patterns are disposed in the first space part.

7. The touch window of claim 5, wherein a plurality of dummy patterns are disposed between the first first unit cell electrode pattern and the first and second second unit cell electrode patterns adjacent to the first first unit cell electrode pattern.

8. The touch window of claim 1, wherein the second lead electrode is integrally formed with the second unit cell electrode patterns.

9. The touch window of claim 1, comprising a second space part between a third second unit cell electrode pattern and a second first unit cell electrode pattern and a third first unit cell electrode pattern adjacent to the third second unit cell electrode pattern.

10. The touch window of claim 9, wherein the first space part and the second space part are partially overlapped.

11. The touch window of claim 9, wherein a minimum width of the second space part is smaller than a minimum width of at least one of the first lead electrode and the second lead electrode.

12. The touch window of claim 1, wherein the one first unit cell electrode pattern and the first and second second unit cell electrode patterns comprise at least one of indium-tin oxide (ITO), indium zinc oxide (IZO), zinc oxide (ZnO), carbon nano-tube (CNT), graphene, silver nano-wire (Ag NW), and conductive polymer.

13. The touch window of claim 1, wherein a height of a top surface of the first lead electrode is different from a height of a top surface of the second lead electrode.

14. The touch window of claim 1, wherein the base substrate comprises at least one of the polyethylene terephthalate (PET), polycarbonate (PC), polyether sulfone (PES), polyimide (PI), and polymethyl methacrylate (PMMA).

15. The touch window of claim 1, wherein a thickness of the cover window is greater than a thickness of the base substrate.

16. The touch window of claim 1, wherein the two-first and second second unit cell electrode patterns are electrically connected to each other.

17. A touch device comprising:
    an organic light emitting device;
    a touch window on the organic light emitting device;
    the touch window comprising:
    a cover window;
    a base substrate;
    a first sensing electrode formed on the base substrate and comprising first unit cell electrode patterns and a first lead electrode connecting two first unit cell electrode patterns to each other;
    a second sensing electrode that crosses the first sensing electrode formed on the base substrate and comprising second unit cell electrode patterns and a second lead electrode connecting two second unit cell electrode patterns to each other;
    a first space part between a first first unit cell electrode pattern and a first second unit cell electrode pattern and a second second unit cell electrode pattern adjacent to the first first unit cell electrode pattern, such that an area of the first space part is a sum of a first area between the first first unit cell electrode pattern and the first second unit cell electrode pattern and a second area between the first first unit cell electrode pattern and the second second unit cell electrode pattern, wherein the first first unit cell electrode pattern, the first second unit cell electrode pattern, and the second second unit cell electrode pattern are disposed on a same surface of the substrate, and
    wherein a ratio of the area of the first space part to an area of the first first unit cell electrode pattern is in a range of 10% to 20%.

18. The touch device of claim 17, wherein a minimum distance between one first unit cell electrode pattern and one second unit cell electrode pattern is 30 μm or less.

19. The touch device of claim 17, wherein a minimum width of the first space part is 30 μm or less.

20. The touch device of claim 17, wherein a minimum width of the first space part is smaller than a minimum width of at least one of the first lead electrode and the second lead electrode.

21. The touch device of claim 17, comprising a second space part between a third second unit cell electrode pattern and a second first unit cell electrode pattern and a third first unit cell electrode pattern adjacent to the third second unit cell electrode pattern.

* * * * *